US008639091B2

(12) United States Patent
Derrenberger

(10) Patent No.: US 8,639,091 B2
(45) Date of Patent: Jan. 28, 2014

(54) ADVERTISEMENT BIDDING FOR DATA RECORDING DEVICES

(75) Inventor: Mike Arthur Derrenberger, Fishers, IN (US)

(73) Assignee: Thomson Licensing, Boulogne-Billancourt (FR)

(*) Notice: Subject to any disclaimer, the term of this patent is extended or adjusted under 35 U.S.C. 154(b) by 3205 days.

(21) Appl. No.: 10/171,198

(22) Filed: Jun. 13, 2002

(65) Prior Publication Data

US 2003/0231854 A1 Dec. 18, 2003

(51) Int. Cl.
*H04N 9/80* (2006.01)
(52) U.S. Cl.
USPC .......................................... 386/249; 386/248
(58) Field of Classification Search
USPC ................. 386/1, 45–46, 125–126, 248–251, 386/291–296; 358/908
See application file for complete search history.

(56) References Cited

U.S. PATENT DOCUMENTS

| | | | | |
|---|---|---|---|---|
| 5,532,735 A * | 7/1996 | Blahut et al. | ..................... | 725/32 |
| 5,940,072 A * | 8/1999 | Jahanghir et al. | ............. | 715/716 |
| 5,999,691 A | 12/1999 | Takagi et al. | ................... | 386/46 |
| 6,233,389 B1 | 5/2001 | Barton et al. | ................... | 386/46 |
| 6,311,011 B1 * | 10/2001 | Kuroda | ........................... | 386/46 |
| 6,411,771 B1 * | 6/2002 | Aotake | ........................... | 386/52 |
| 6,698,020 B1 * | 2/2004 | Zigmond et al. | ................ | 725/34 |
| 2001/0041053 A1 | 11/2001 | Abecassis | ....................... | 386/83 |
| 2001/0051037 A1 | 12/2001 | Safadi et al. | ................... | 386/83 |

FOREIGN PATENT DOCUMENTS

| | | | | |
|---|---|---|---|---|
| GB | 2357606 A | 6/2001 | ............. | G06F 12/14 |
| WO | WO 99/43111 | 8/1999 | ............. | H04H 1/02 |

* cited by examiner

*Primary Examiner* — Thai Tran
*Assistant Examiner* — Nigar Chowdhury
(74) *Attorney, Agent, or Firm* — Vincent E. Duffy; Joel M. Fogelson

(57) ABSTRACT

An advertisement based bidding scheme enables users of data recording devices to bid on the quantity of advertisements they are willing to observe in exchange for recording quality. According to an exemplary embodiment, a data recording device (11, 21, 31) includes a processor (206) operative to receive and process a user bid indicating a quantity of advertisements the user is willing to observe in exchange for a given level of recording quality. A storage medium (203) is operative to record program data in accordance with the given level of recording quality indicated by the user bid. A decoder (204) is operative to decode and enable playback of the recorded program data including the quantity of advertisements indicated by the user bid.

14 Claims, 5 Drawing Sheets

ADVERTISEMENT BIDDING FOR DATA RECORDING DEVICES

The present invention generally relates to data recording and playback devices, and more particularly, provides a data recording and playback system that utilizes an advertisement bidding scheme that enables users of a data recording and playback device to bid on the quantity of advertisements they are willing to observe, wherein the user bid is used to set a characteristic of the recording and playback device, such as the recording/reproduction quality, the recording capacity, and/or the number of programs capable of being recorded/reproduced.

Data recording and playback devices, such as personal video recorders ("PVRs"), are generally known in the art. Such devices enable users to, among other things, record video data and replay the recorded video data at a later time. In this manner, PVRs provide certain functionality similar to conventional video cassette recorders ("VCRs"). However, PVRs store data in digital memories (e.g., hard disk), whereas conventional VCRs store analog data on magnetic tapes. As a result of this difference, PVRs provide certain advantages over conventional VCRs. For example, PVRs offer users greater flexibility in their ability to identify, record and retrieve data segments that may be of interest to the user.

While the functionality provided by PVRs is attractive, these devices may be too expensive for some consumers. Additionally, the costs associated with a PVR are not necessarily limited to the purchase price of the device itself, but may also include a recurring monthly service charge that is required to enable and maintain device operability. As a result, some consumers may be unable, or choose not, to purchase a PVR. Accordingly, there is a need to make PVRs more affordable for consumers.

One such way to make PVRs more affordable for consumers involves using an advertising subsidy. In particular, advertising sponsors may be willing to subsidize the purchase price of a PVR and/or its monthly service charge if it can be shown that PVR users are willing to observe their advertisements. Currently, however, there is no scheme for notifying advertising sponsors that PVR users have indicated a willingness to observe their advertisements in exchange for certain recording/reproduction capabilities, for confirming that the user has responded in a manner that indicates that a particular advertisement, or set of advertisements, has been observed, and for billing the advertisers based on actual indications of the advertisements having been observed. Accordingly, there is a need for such a scheme so that advertising sponsors may be willing to subsidize at least some of the costs associated with a PVR, and thereby render such devices more affordable for consumers. The present invention addresses these and other issues.

In accordance with an aspect of the present invention, a method for controlling a data recording/playback device is disclosed. The method comprises the steps of: receiving a user request to record a selected program signal or to playback a program signal stored on a data storage device; providing the user with an opportunity to enter a user bid indicative of a quantity of advertisements the user is willing to observe in exchange for a selected characteristic of recording, or playback; receiving the user bid indicating the quantity of advertisements the user is willing to observe; and setting the recording or playback characteristic of the digital record/playback apparatus in response to the user bid. The characteristics may include, for example, the recording quality, the playback quality, and the recording capacity. The quality of the recording or playback may be controlled by, for example, encoding or decoding rate, adding distortions to the picture, etc.

In accordance with another aspect of the present invention, an apparatus for enabling presentation of advertisements is disclosed. The apparatus comprises: a video input for receiving one of a plurality of program signals; a video output for providing a signal suitable for display on a video display device; a video processing unit coupled to the video input, the data storage unit, and the video output, for receiving a selected program signal and generating a output signal; and a control unit, operatively coupled to the video input, the video output, and the video processing unit, for controlling the video input to select a program signal and controlling the operation of the video processing unit and the video output to generate signals representative of an on-screen display for allowing a user to enter a bid indicating the quantity of advertisements the user is willing to observe in exchange for a selected recording, or playback, characteristic, in response to a user command to record or playback a selected program, and wherein the control unit sets the selected characteristic of the apparatus in response to the user bid.

In accordance with yet another aspect of the present invention, a method for presenting advertisements using a data recording/playback device, and in particular, a method for a service provider to generate additional revenue by presenting advertisements in exchange for certain operating characteristic of the data recording/playback device is disclosed. The method comprises the steps of: transmitting advertisements to be inserted during playback of a selected programs from the data recording/playback device, wherein a quantity of advertisements is inserted during the playback in response to a user bid to observe the quantity of advertisements in exchange for a particular setting of the data recording/playback device; receiving data indicative of the user having observed the quantity of advertisements inserted into the playback of the selected program from the data recording/playback device; maintaining a record of the data indicative of the advertisements the user has observed; and generating a bill directed to each respective advertiser based on the number of times selected advertisements have been displayed and indicated to have been observed in response to the record of the data indicative of the advertisements the user has observed.

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

The present invention is applicable to video and/or audio programming and the advertisements included therein. For purposes of example and explanation, however, the present invention will be described herein with reference to programming that includes video data. However, the principles of the present invention may also be applied to other types of programming, such as radio programming (e.g., satellite radio) that includes only audio data, and streaming media received via the internet.

Figure 1:
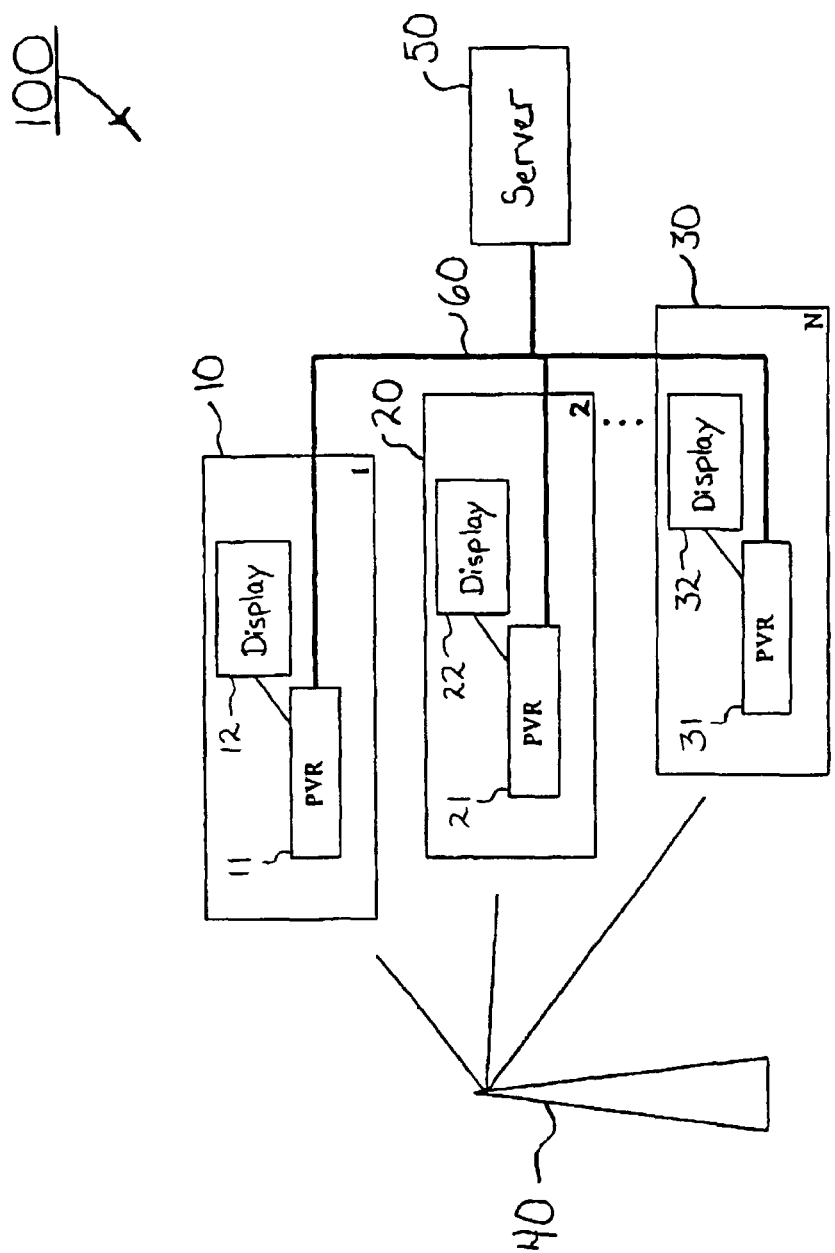
FIG. 1 is an exemplary environment suitable for implementing the present invention.

Referring now to the drawings, and more particularly to FIG. 1, an exemplary environment 100 suitable for implementing the present invention is shown. In FIG. 1, environment 100 comprises a plurality of exemplary user systems 10, 20, 30, a data transmission source 40, a server 50, and a communication link 60. For purposes of explanation and example, environment 100 is shown in FIG. 1 as including only three user systems (i.e., 1, 2 . . . N). In practice, however, it is contemplated that any number of such user systems may be included in environment 100. For example, there may be one or more such user systems associated with a given household.

According to an exemplary embodiment, each user system 10, 20, 30 comprises a personal video recorder ("PVR") 11, 21, 31, and a display device 12, 22, 32, respectively, and is capable of, among other things, receiving, recording and displaying program data. Each display device 12, 22, 32 includes a variable visual display terminal and may, for example, be embodied as a television signal receiver, monitor or other device. As is known in the art, each PVR 11, 21, 31 is capable of recording program data wherein a user designates the programs to be recorded via an electronic program guide or through inputs indicative of starting and ending points of the desired program. A user may designate the program to be recorded for recording only those portions of the program data that may be of interest. Further details regarding PVRs 11, 21, 31 will be provided later herein with reference to FIG. 2.

According to an exemplary embodiment, data transmission source 40 transmits data, such as video and/or audio program data and advertisements in digital and/or analog format to each of the plurality of user systems 10, 20, 30, in a manner well known to those skilled in the art. Data transmission source 40 may, for example, transmit data via terrestrial, cable, satellite, fiber optic, digital subscriber line ("DSL"), ethernet and/or other type of broadcast and/or multicast means.

According to an exemplary embodiment, server 50 is operatively coupled to each user system 10, 20, 30 via communication link 60 such as a telephone, cable, fiber optic, DSL, ethernet, wireless and/or other link. Server 50 is capable of, among other things, exchanging data with PVRs 11, 21, 31 of user systems 10, 20, 30, providing periodic updates to the software for controlling the PVRs, and transmitting operating instructions to a selected one of the PVRs. In the event that environment 100 is large and distributed, there may be a plurality of servers 50, each servicing a particular portion of environment 100. Moreover, the functions of data transmission source 40 and server 50 as described herein may be combined into a single source for transmitting and receiving data.

Figure 2:
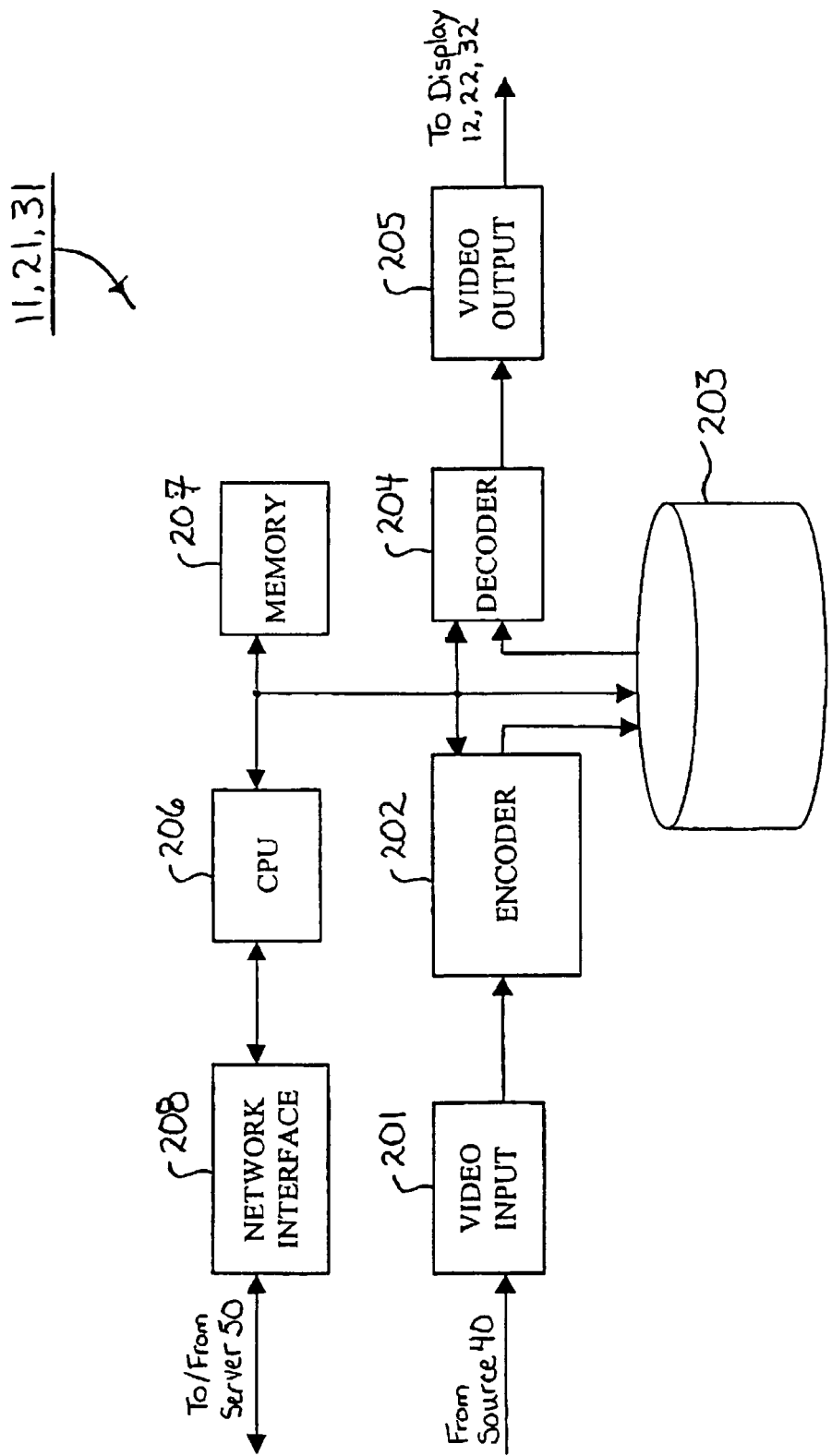
FIG. 2 is a diagram of an exemplary personal video recorder ("PVR") of FIG. 1.

Referring now to FIG. 2, further details of an individual PVR 11, 21, 31 of FIG. 1 are shown. Note that the details shown in FIG. 2 are merely exemplary, and are not intended to be limiting in any manner. Moreover, PVR 11, 21, 31 of FIG. 2 is shown, and will be described, with a primary emphasis on video data. However, it will be intuitive to those skilled in the art that other types of data (e.g., audio, internet, etc.) may also be accommodated. It is contemplated that PVR 11, 21, 31 shown in FIG. 2 may be constructed in a manner known by those skilled in the art, wherein each PVR 11, 21, 31 of FIG. 1 may be manufactured by a different manufacturer, and having the appropriate software elements incorporated therein.

In FIG. 2, a video input unit 201 receives from data transmission source 40 digital and/or analog video data (e.g., program data and advertisements), and processes the same in a known manner to generate and output processed data. An encoder 202 receives the processed data output from video input unit 201, and performs an encoding operation upon the received data if necessary. In particular, when the data output from video input unit 201 is in an analog format or an undesired digital format, encoder 202 may perform an encoding operation to convert the analog or digital data to a predetermined digital format, for example MPEG-2, suitable for efficient storage on storage unit 203. Alternatively, when the data output from video input unit 201 is already in the predetermined digital format, no encoding operation by encoder 202 may be necessary. Moreover, encoder 202 is capable of encoding program data at a plurality of different encoding bit rates.

A non-volatile storage unit 203, such as a hard disk drive or other storage medium, receives and stores data such as the digital data provided from encoder 202. During playback, decoder 204 performs a decoding operation upon data stored in non-volatile storage unit 203 to enable playback of the data. A video output unit 205 receives decoded data output from decoder 204, and performs a processing operation thereon in a known manner to generate and output processed video signal, such as NTSC or PAL, suitable for generating a display on display 12, 22, 32 of FIG. 1.

A central processing unit ("CPU") 206 controls the general operations of PVR 11, 21, 31. For example, CPU 206 receives user inputs via an input terminal such as a hand-held remote control unit or other input means (not shown), and based on the user inputs, enables selected programs or portions of received data to be recorded in non-volatile storage unit 203. CPU 206 also controls and/or enables other operations of PVR 11, 21, 31. Among other things, CPU 206 controls the encoding bit rate of encoder 202, controls and enables data recording and playback operations, enables on-screen displays to be generated, and detects user inputs. Other functions of CPU 206 may be described later herein.

A memory 207 stores data, such as operating system data, file management data, and application program data, which is selectively retrieved and utilized by CPU 206 in a known manner during operation of PVR 11, 21, 31. A network interface unit 208 also communicates with CPU 206, and enables data to be exchanged with server 50 under the control of CPU 206. In one embodiment, data regarding advertisements observed by the user may also be collected and stored in memory 207 for later transmission to a server maintained by a service provider, wherein such data may be used to bill the advertisers on the basis of advertisements actually inserted into playback and indicated to have been observed by the user.

Figure 3:
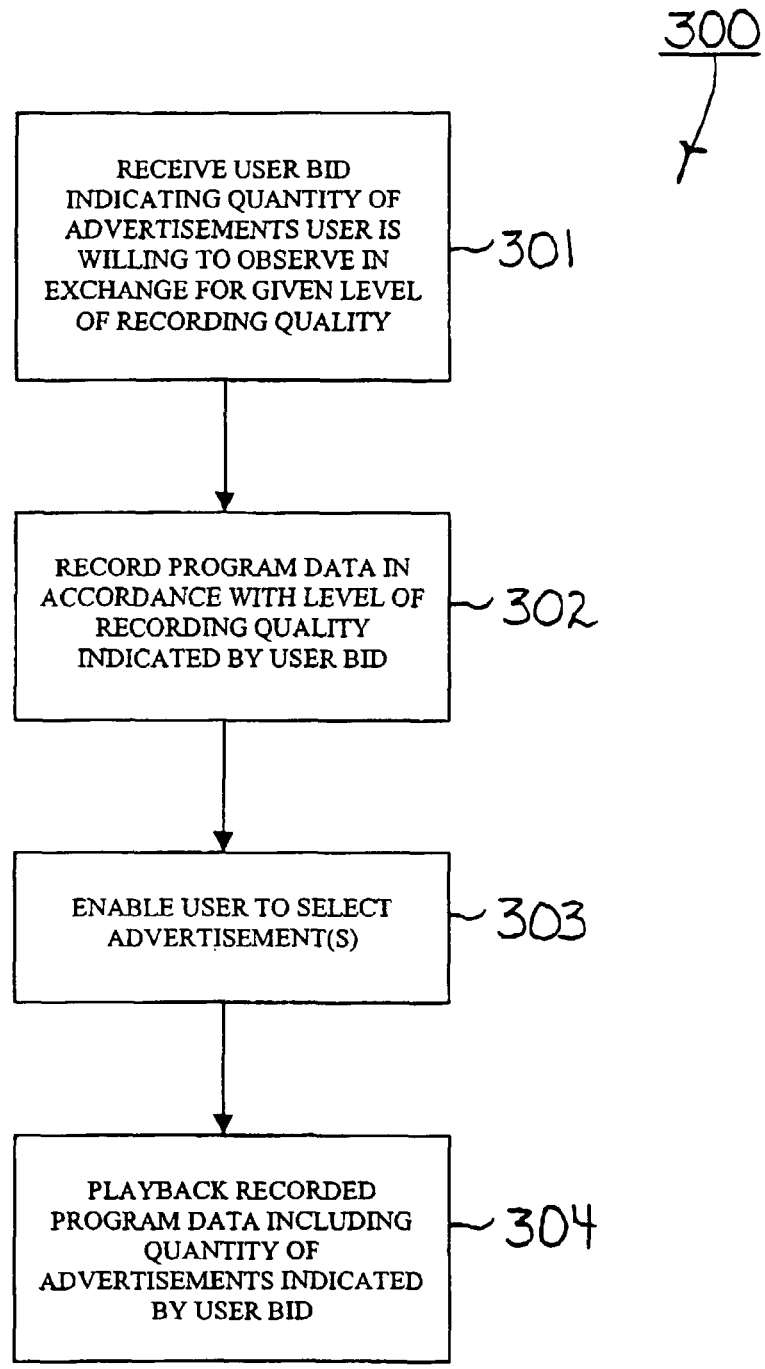
FIG. 3 is a flowchart illustrating exemplary steps according to an embodiment of the present invention.

Referring now to FIG. 3, a flowchart 300 illustrating exemplary steps according to an embodiment of the present invention is shown. For purposes of example and explanation, the steps of FIG. 3 will be described with reference to environment 100 of FIG. 1, and more particularly, to only one user system 10, 20, 30 and associated PVR 11, 21, 31. In practice, however, the steps of FIG. 3 may be performed by more than one user system 10, 20, 30 and associated PVR 11, 21, 31. Accordingly, the steps of FIG. 3 are merely exemplary, and are not intended to limit the present invention in any manner.

The user interface, including the OSDs, for providing the user with the options detailed below may be designed and generated as known by those skilled in the art, for example, by providing a screen having a plurality of menu buttons for selecting the quantity of advertisements, the types of advertisements, the time period for accepting the advertisements, etc. Further, although the steps below are described with reference to setting the recording quality or playback quality level, the present invention contemplates altering other recording/playback characteristics, such as, available recording time, available recording time for a predetermined period of time, advertisements shown per selected period of time, etc, in exchange for the user bid.

At step 301, a user inputs a bid to PVR 11, 21, 31 using an OSD for processing by CPU 206. In particular, the user bid at step 301 indicates a quantity of advertisements the user is willing to observe (i.e., view and/or listen to) in exchange for a given level of recording quality. The quantity of advertisements indicated by the user bid at step 301 may be represented in a variety of different ways. According to an exemplary embodiment, the quantity of advertisements indicated by the user bid may represent a given number of advertisements. For example, a user may bid 5 advertisements in order to record a particular program at the highest level of recording quality available from PVR 11, 21, 31. According to another exemplary embodiment, the quantity of advertisements indicated by the user bid may represent a time duration of advertisements. For example, a user may bid 2 minutes of advertisements in order to record a particular program at the highest level of recording quality available from PVR 11, 21, 31. According to another exemplary embodiment, the bid may indicate a product category of advertisements, wherein certain types of products provide better recording quality.

Figure 5:
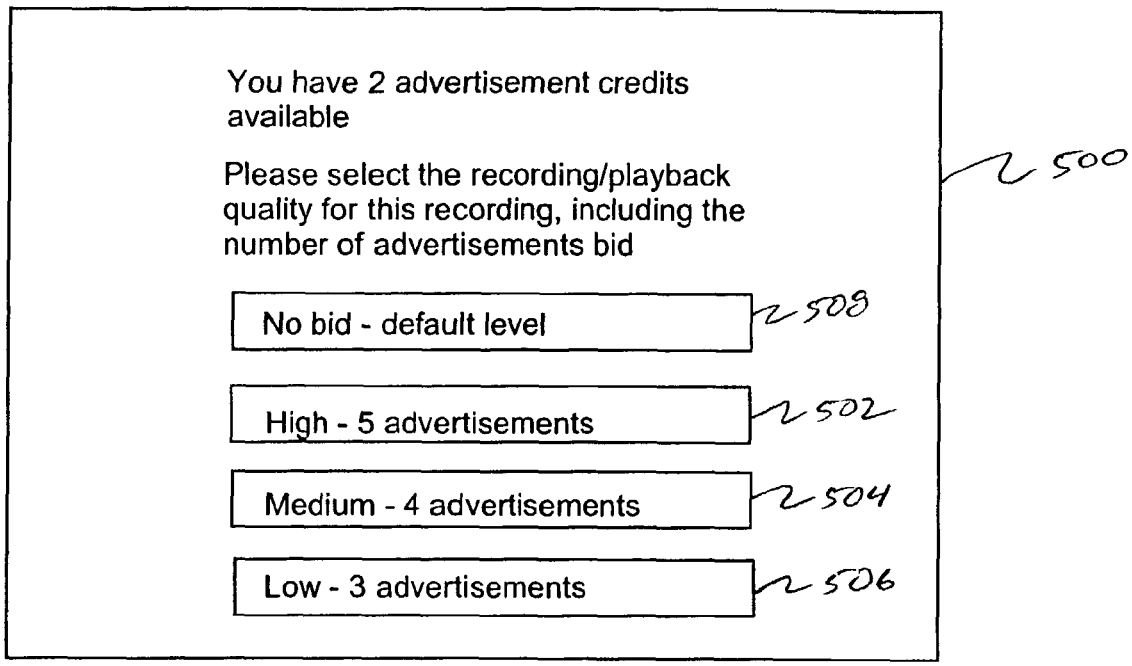
FIG. 5 is a screen display that is suitable for allowing the user to select a level of quality of recording in exchange for observing a selected number of advertisements.
Figure 6:
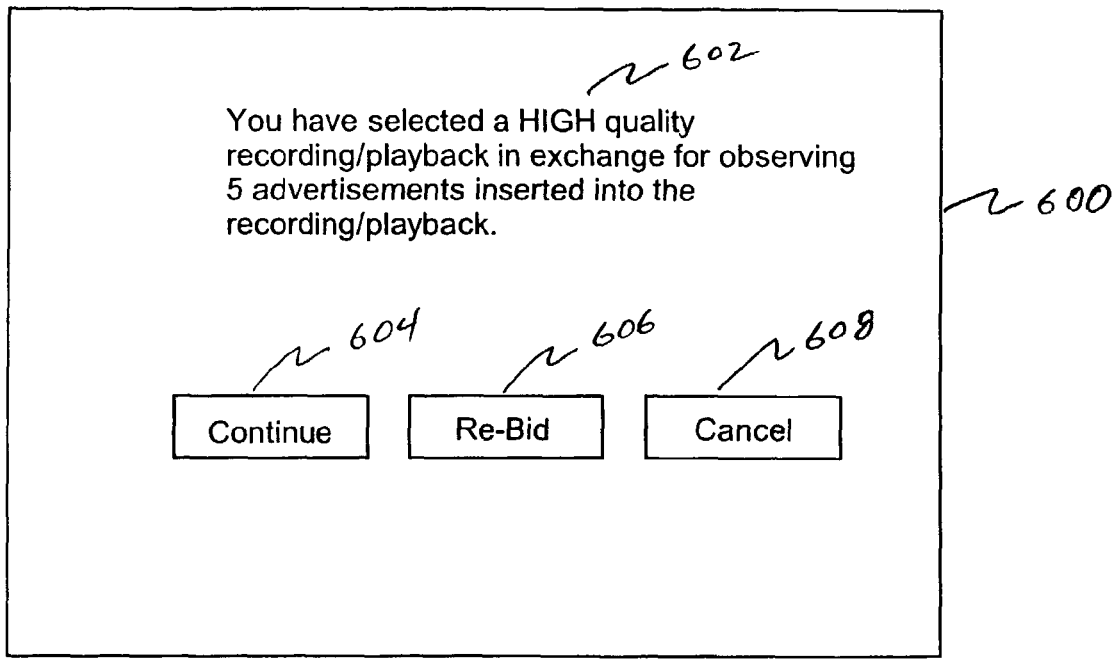
FIG. 6 is a screen display that is suitable for confirming the level of recording quality selected by the user.

An example display for inputting a bid is shown in FIG. 5, wherein the user is provided the opportunity of selecting one of buttons 502, 504, and 506 to bid on the number of advertisements. The user may elect not to bid, and in such a case, the recording or playback quality is set to the lowest level. The screen may also indicate any excess prior advertisement credits available for use in the selected recording if the system has been configured to allow the user to build up advertisement credits for later use, for example, by agreeing to observe more than the number of advertisements required for the maximum recording quality. FIG. 6 is an example display for confirming the user selection of a particular recording quality level and allowing the user to select one of buttons 604, 606, and 608 for continuing, resetting the bid, or canceling the recording. Any suitable displays that include selection buttons and status displays that allow the user to control the bidding process, for example, by accepting a bid, confirming a bid, allowing adjustments to the bid, etc., may be used in implementing the bidding process.

The level of recording quality indicated by the user bid at step 301 may also be represented in a variety of different ways. According to an exemplary embodiment, the level of recording quality indicated by the user bid may represent an encoding bit rate. For example, with MPEG-2 encoding, an encoding bit rate of 6 megabits/second may represent the highest level of recording quality available from PVR 11, 21, 31. Similarly, an encoding bit rate of 3 megabits/second may represent an intermediate level of recording quality available from PVR 11, 21, 31, and an encoding bit rate of 1.5 megabits/second may represent the lowest level of recording quality available from PVR 11, 21, 31. According to another exemplary embodiment, the level of recording quality indicated by the user bid at step 301 may represent a parameter other than encoding bit rate. For example, the level of recording quality may represent the degree to which PVR 11, 21, 31 adds visual impairments to program data during recording. Such visual impairments may be created, for example, by adding noise to program data during recording. The number of different levels of recording quality available from PVR 11, 21, 31 is simply a matter of design choice.

According to the present invention, more desirable programs may have higher bid requirements than less desirable programs. For example, a user may have to bid 5 advertisements in order to record a major sporting event (e.g., the Super Bowl) at a given level of recording quality, but may have to bid only 1 advertisement in order to record another type of program (e.g., the local news) at the same level of recording quality the bids required for the various levels may be indicated on display 500. PVR 11, 21, 31 may, for example, enable an on-screen display (e.g., electronic program guide) to inform a user regarding bid requirements for various programs. In this regard, desirability ratings may be attached to the programs and indicated, for example, on an electronic program guide. The desirability of a program may also be determined on the time period in which the program is broadcast. For example, programs broadcast during prime times, during certain days, may require the user to accept a higher number of advertisements.

The bid may be input to PVR 11, 21, 31 at step 301 before or after the user inputs a record command to PVR 11, 21, 31. According to an exemplary embodiment, the user bid at step 301 may be solicited by PVR 11, 21, 31 in response to the record command. For example, when a user inputs the record command, CPU 206 of PVR 11, 21, 31 may enable generation and display of an on-screen display 500 that prompts the user to input his or her bid. According to another exemplary embodiment, the user bid at step 301 may be input as part of a user profile such that the bid applies to all recording and playback operations of PVR 11, 21, 31 that are initiated by a particular user. According to yet another exemplary embodiment, the user bid at step 301 may be input periodically (e.g., daily, weekly, monthly, etc.) such that the bid applies to all recording and playback operations of PVR 11, 21, 31 for a given time period. In an embodiment where the user bid is used to allocate a certain amount of recording time, the user may be required to regularly update or add additional bids to continue to have additional recording capacity to add new programs. Other forms of advertisement bidding may also be used in accordance with the present invention.

If the user does not wish to enter a bid at step 301, PVR 11, 21, 31 may provide a "free" or default level of recording quality that is very low (e.g., less than 1.5 megabits/second encoding rate). In this manner, if a user fails to input a bid at step 301, or if the user bid indicates an unwillingness to observe any advertisements, PVR 11, 21, 31 may only provide a very low level of recording quality. Alternatively, step 301 may be implemented such that a minimum quantity of advertisements must be bid in order to enable the lowest level of recording quality available from PVR 11, 21, 31. The confirmation of the user bid is shown in display 600.

After the user inputs a bid to PVR 11, 21, 31 at step 301, process flow advances to step 302. At step 302, PVR 11, 21, 31 receives program data (e.g., one or more television programs) from data transmission source 40, records the received program data in non-volatile storage unit 203 in accordance with the level of recording quality indicated by the user bid at step 301. One or more advertisements may also accompany, and be recorded with the received program data at step 302. Data transmission source 40 may additionally, or alternatively, transmit advertisements to PVR 11, 21, 31 for recording separately from the program data at step 302. For example, data transmission source 40 may periodically (e.g., daily, weekly, monthly, etc.) transmit advertisements to PVR 11, 21, 31 for recording and later insertion during reproduction of a recording. Regardless of transmission time, each advertisement transmitted from data transmission source 40 may include a unique identifier (e.g., packet identifier) that enables PVR 11, 21, 31 to distinguish advertisements from program data. Such identifiers may, for example, be utilized by PVR 11, 21, 31 to enable a desired level of recording quality for the advertisements. For example, according to an exemplary embodiment, advertisements are always recorded at the highest level of recording quality available from PVR 11, 21, 31, irrespective of the level of recording quality indicated by the user bid at step 301. In this manner, program data and advertisements may be recorded by PVR 11, 21, 31 at different levels of recording quality at step 302.

Next, at step 303, CPU 206 of PVR 11, 21, 31 may enable the user to select one or more advertisements that will be used to satisfy the requirements of his or her bid. For example, CPU 206 may enable generation and display of an on-screen menu listing the advertisements that are currently stored therein, and that may be selected by the user to satisfy the advertisement observation requirements of his or her bid. Such a menu may, for example, list advertisements by name, duration and/or other descriptor. The user may then provide inputs to PVR 11, 21, 31 to thereby select the advertisements that will be used to satisfy the requirements of his or her bid. In this manner, the user may exercise control as to which advertisements will be presented during playback. It is noted that step 303 may be optional in carrying out the present invention. That is, PVR 11, 21, 31 may not necessarily enable the user to select which advertisements will be presented during playback, or the user may choose not to select any advertisements. Accordingly, if step 303 is not performed, the user cannot exercise control regarding which advertisements will be presented during playback.

At step 304, PVR 11, 21, 31 plays back the program data recorded at step 302 including the quantity of advertisements indicated by the user bid under the control of CPU 206. In particular, CPU 206 controls decoder 204 which performs a decoding operation to enable playback. When step 303 is performed, CPU 206 enables the advertisement(s) selected by the user at step 303 to be used as the quantity of advertisements indicated by the user bid. Accordingly, these selected advertisement(s) may be presented during playback at step 304. Alternatively, when step 303 is not performed, CPU 206 may control (without user input) which advertisements are used to represent the quantity of advertisements indicated by the user bid, and accordingly, which advertisements are presented during playback at step 304.

During playback at step 304, the program data and the advertisements may exhibit different levels of reproduction quality (e.g., video resolution). As previously indicated herein, advertisements are preferably recorded at the highest level of recording quality available from PVR 11, 21, 31, irrespective of the level of recording quality indicated by the user bid at step 301. Accordingly, if the user bid at step 301 indicates a level of recording quality that is less than the highest level of recording quality available from PVR 11, 21, 31, then the program data will have a lower level of reproduction quality than the advertisements during playback. Alternatively, if the user bid at step 301 indicates a level of recording quality that is equal to the highest level of recording quality available from PVR 11, 21, 31, then the program data and the advertisements will have the same level of reproduction quality during playback.

Also during playback at step 304, the user must satisfy the advertisement observation requirements of his or her bid. That is, the user must actually observe (i.e., view and/or listen to) the quantity of advertisements indicated by the bid. The advertisements may be displayed at the beginning of the playback of the recorded material, at the end of the playback, and/or at various intervals during playback as desired. The designated advertisements may supplement the advertisement included with the program material. To ensure that the user satisfies the advertisement observation requirements of his or her bid during playback, various different techniques may be employed.

According to an exemplary embodiment, CPU 206 of PVR 11, 21, 31 may enable generation and display of an on-screen overlay that the user must respond to in order for playback to continue. For example, CPU 206 may periodically cause a random number to be displayed on-screen. In order to continue playback, the user must respond to this random number by inputting a matching number to PVR 11, 21, 31 that is detected by CPU 206. As another example, CPU 206 may periodically cause an icon to be displayed on-screen. Again, the user must respond to this icon by providing a predetermined input (e.g., pressing select key on remote control) to PVR 11, 21, 31 in order for playback to continue. Furthermore, PVR 11, 21, 31 may be controlled to ignore keypresses on the remote control that would hinder effective display of the designated advertisement, for example, fast forward, skip ahead, mute, etc. Other techniques for ensuring that the user actually satisfies the advertisement observation requirements of his or her bid during playback may also be used in accordance with the present invention.

Figure 4:
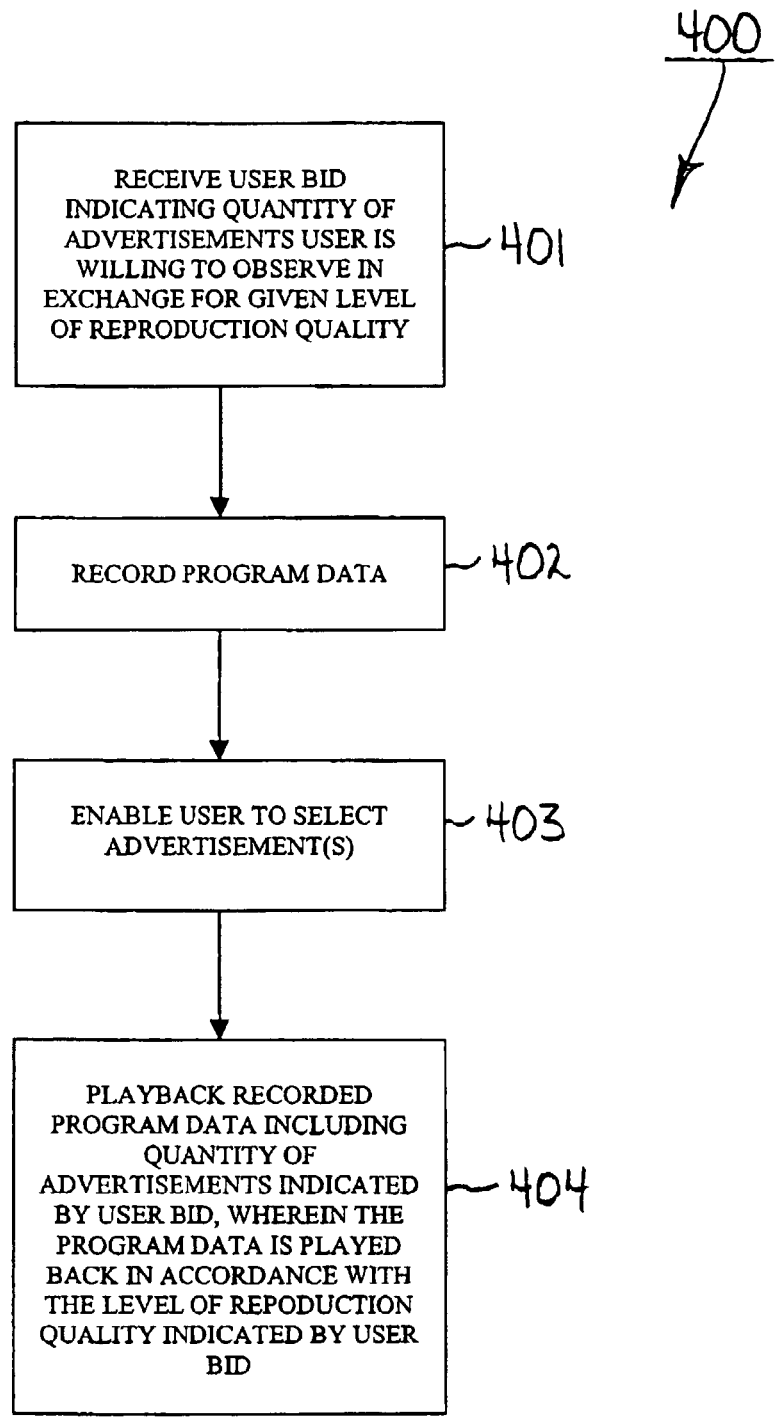
FIG. 4 is a flowchart illustrating exemplary steps according to another embodiment of the present invention.

Referring now to FIG. 4, a flowchart 400 illustrating exemplary steps according to another embodiment of the present invention is shown. The embodiment of FIG. 4 is similar to the embodiment of FIG. 3 in that both embodiments involve advertisement bidding. With the embodiment of FIG. 4, however, a user bids a quantity of advertisements the user is willing to observe in exchange for a given level of "reproduction" quality, as opposed to a given level of "recording" quality with the embodiment of FIG. 3. Like FIG. 3, the steps of FIG. 4 will be described with reference to environment 100 of FIG. 1, and more particularly, to only one user system 10, 20, 30 and associated PVR 11, 21, 31. In practice, however, the steps of FIG. 4 may be performed by more than one user system 10, 20, 30 and associated PVR 11, 21, 31. Accordingly, the steps of FIG. 4 are merely exemplary, and are not intended to limit the present invention in any manner. For clarity, the following description of FIG. 4 may refer to the steps of FIG. 3, where appropriate.

At step 401, a user inputs a bid to PVR 11, 21, 31 for processing by CPU 206. In particular, the user bid at step 401 indicates a quantity of advertisements the user is willing to observe (i.e., view and/or listen to) in exchange for a given level of reproduction quality. Step 401 is substantially identical to step 301 of FIG. 3 in many respects. For example, the quantity of advertisements indicated by the user bid at step 401 may be represented in different ways, such as by a given number of advertisements or a duration of advertisements. The primary difference between steps 301 and 401 is that the user bid at step 401 indicates a given level of "reproduction" quality, as opposed to a given level of "recording" quality. Displays similar to 500 and 600 may be generated to allow the user to select the level of reproduction quality and to confirm the user selection.

The level of reproduction quality indicated by the user bid at step 401 may be represented in a variety of different ways. According to an exemplary embodiment, the level of reproduction quality indicated by the user bid may represent how program data is processed during playback. For example, at the highest level of reproduction quality available from PVR 11, 21, 31, all possible processing functions may be performed during playback. Similarly, at lower levels of reproduction quality, PVR 11, 21, 31 may avoid performing certain processing functions (e.g., filtering operations, etc.), or may add noise to program data during playback. The number of different levels of reproduction quality available from PVR 11, 21, 31 is simply a matter of design choice.

After the user inputs a bid to PVR 11, 21, 31 at step 401, process flow advances to step 402. At step 402, PVR 11, 21, 31 receives program data (e.g., one or more television programs) from data transmission source 40, and records the received program data in non-volatile storage unit 203 in accordance with a given level of recording quality. Unlike step 302 of FIG. 3, the level of recording quality provided at step 402 is independent from the user bid. That is, PVR 11, 21, 31 records program data at step 402 without reference to the user bid at step 401. Like step 302 of FIG. 3, however, one or more advertisements may accompany, and be recorded with the received program data at step 402. Advertisements may also be transmitted to PVR 11, 21, 31 for recording separately from the program data at step 402, such as on a periodic basis (e.g., daily, weekly, monthly, etc.). According to an exemplary embodiment, PVR 11, 21, 31 may be adapted to record data at only a single level of recording quality which is relatively high. Accordingly, at step 402, program data and advertisements may be recorded at the same level of recording quality, which is relatively high.

Each advertisement transmitted from data transmission source 40 may include a unique identifier (e.g., packet identifier) that enables PVR 11, 21, 31 to distinguish advertisements from program data. Such identifiers may, for example, be utilized by PVR 11, 21, 31 to enable a desired level of reproduction quality for the advertisements during playback. For example, according to an exemplary embodiment, advertisements are preferably always reproduced at the highest level of reproduction quality available from PVR 11, 21, 31, irrespective of the level of reproduction quality indicated by the user bid at step 401. In this manner, program data and advertisements may be recorded by PVR 11, 21, 31 at the same level of recording quality at step 402, but as will be explained later herein, reproduced at different levels of reproduction quality.

Next, at step 403, CPU 206 of PVR 11, 21, 31 may enable the user to select one or more advertisements that will be used to satisfy the requirements of his or her bid. For example, CPU 206 may enable generation and display of an on-screen menu listing the advertisements that are currently stored therein, and that may be selected by the user to satisfy the advertisement observation requirements of his or her bid. Accordingly, step 403 is substantially identical to step 303 of FIG. 3.

At step 404, PVR 11, 21, 31 plays back the program data recorded at step 402 including the quantity of advertisements indicated by the user bid under the control of CPU 206. In particular, CPU 206 controls decoder 204, which performs a decoding operation to enable playback of the program data in accordance with the level of reproduction quality indicated by the user bid at step 401. When step 403 is performed, CPU 206 enables the advertisement(s) selected by the user at step 403 to be used as the quantity of advertisements indicated by the user bid. Accordingly, these selected advertisement(s) may be presented during playback at step 404. Alternatively, when step 403 is not performed, CPU 206 may control (without user input) which advertisements are used to represent the quantity of advertisements indicated by the user bid, and accordingly, which advertisements are presented during playback at step 404.

During playback at step 404, the program data and the advertisements may exhibit different levels of reproduction quality (e.g., video resolution). As previously indicated herein, advertisements are preferably always reproduced at the highest level of reproduction quality available from PVR 11, 21, 31, irrespective of the level of reproduction quality indicated by the user bid at step 401. Accordingly, if the user bid at step 401 indicates a level of reproduction quality that is less than the highest level of reproduction quality available from PVR 11, 21, 31, then the program data will have a lower level of reproduction quality than the advertisements during playback. Alternatively, if the user bid at step 301 indicates a level of reproduction quality that is equal to the highest level of reproduction quality available from PVR 11, 21, 31, then the program data and the advertisements will have the same level of reproduction quality during playback.

Like step 304 of FIG. 3, the user must satisfy the advertisement observation requirements of his or her bid during playback at step 404. That is, the user must actually observe (i.e., view and/or listen to) the quantity of advertisements indicated by the bid. To ensure that the user satisfies the advertisement observation requirements of his or her bid during playback, various techniques such as those previously described herein with reference to step 304 of FIG. 3 may be employed during playback at step 404.

It is clear that the above described method and apparatus may be used in a novel business method for encouraging and enabling widespread usage of PVRs and allowing service providers to generate revenue from the use of such PVRs. The additional revenue is generated from targeted advertising, which allows the service providers to receive a fee from the advertisers for each time a selected advertisement is displayed, and which allow the advertisers to better target the advertising audience.

In such a business method the service provider may distribute the inventive PVRs at relatively low cost to the consumers because the cost of the PVRs would be subsidized by later revenues derived from the advertisers. Selected advertisements are transmitted to, stored on the individual PVRs, and later retrieved for display based on the selections made by the user. The advertisements may be selected by the user or automatically selected by the PVR on the basis of usage patterns that indicate which types of advertisements or products and services might be appealing to the user. Tag information may be added to the advertisements to allow the PVR to distinguish each of the advertisements. Thereafter, each display and observance of the advertisements may be tracked and accumulated by the PVR, and the accumulated information may be later transmitted to a server located at the service provider's facilities. Such information may be sent without identifying the associated user, or PVR, because only the number of times the advertisement is displayed is of concern. The information may then be stored in a database maintained by the service provider and used as the basis for billing the advertisers on a per showing basis. In this manner, the advertisers are better able to target the advertisements, be assured that the advertisement will be presented in a desired form, and pay for the advertisement on a per use basis, or on a category of advertisement display, for example, based on product categories, and the service provider is able to derive a continuing revenue stream from the use of the data recording/playback devices.

As described herein, the present invention provides an advertisement bidding scheme that enables users of data recording devices to bid on the quantity of advertisements they are willing to observe in exchange for recording/reproduction quality. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling a digital record/playback apparatus, comprising the steps of:
   receiving a user request to record a selected program signal or to playback a program signal stored on a data storage device;
   providing the user with an opportunity to enter a user selection indicative of a quantity of advertisements to be observed in exchange for a given recording quality level or playback quality level;
   receiving the user selection indicating the quantity of advertisements to be observed; and
   adjusting operation of the digital record/playback apparatus to set the recording quality level or the playback quality level of the digital record/playback apparatus in response to the user selection.

2. The method according to claim 1, wherein the quantity of advertisements is representative of either a number of advertisements or a time duration of advertisements.

3. The method according to claim 1, wherein the recording quality level is controlled by controlling the encoding bit rate and the playback quality level is controlled by controlling the decoding bit rate.

4. The method according to claim 1, further comprising the step of:
   determining a desirability rating associated with the program selected to be recorded or played back, and wherein the adjusting step comprises adjusting a parameter controlling the recording quality level, or the playback quality level in response to the user selection of the quantity of advertisements and the desirability ratings associated with the program selected.

5. The method according to claim 1, further comprising the steps of:
   allowing the user to select advertisements to be viewed during playback operation;
   retrieving the selected advertisements from the data storage device; and
   inserting and playing the selected advertisements during selected points during playback of a recorded program.

6. The method according to claim 1, further comprising the steps of:
   allowing the user to select advertisements to be viewed during playback operation;
   receiving the selected advertisements from a program signal source during playback of a recorded program; and
   inserting and playing the selected advertisements during playback of the recorded program.

7. The method according to claim 1, wherein the adjusting step comprises the step of designating an available recording capacity for recording programs in response to the user selection to observe the quantity of advertisements.

8. The method according to claim 1, wherein the adjusting step comprises the step of designating an available recording capacity that is available for a predetermined period of time for recording programs in response to the user selection to observe the quantity of advertisements.

9. An apparatus for recording or playing back program signals, comprising:
   a video input for receiving one of a plurality of program signals;
   a video output for providing a signal suitable for display on a video display device;
   a video processing unit coupled to the video input, the data storage unit, and the video output, for receiving a selected program signal and generating a output signal; and
   a control unit, operatively coupled to the video input, the video output, and the video processing unit, for controlling the video input to select a program signal and controlling the operation of the video processing unit and the video output to generate signals representative of an on-screen display for allowing a user to enter a selection indicating the quantity of advertisements to be observed in exchange for a given recording quality level or playback quality level, in response to a user command to record or playback a selected program, and wherein the control unit adjusts an operational parameter to set the recording quality level or the playback quality level of the apparatus in response to the user selection.

10. The apparatus according to claim 9, wherein the recording quality level is controlled by controlling the encoding bit rate.

11. The apparatus according to claim 9, wherein the video output provides signals representing an on-screen display that allows the user to select particular advertisements to be viewed during playback of a selected program, and the control unit retrieves the selected advertisements and causes the selected advertisements to be displayed during playback of the selected program.

12. The apparatus according to claim 9, wherein the control unit sets the recording quality level or the playback quality level of the apparatus in response to the user selection of the quantity of advertisements and a desirability rating associated with the selected program.

13. The apparatus according to claim 9, wherein the recording quality level includes an available recording capacity for recording programs.

14. The apparatus according to claim 9, wherein the recording quality level includes an available recording capacity available for a predetermined period of time for recording programs.

* * * * *